United States Patent Office 3,658,937
Patented Apr. 25, 1972

3,658,937
PROCESS FOR PREPARING DYE-RECEPTIVE POLYOLEFINIC FIBERS
Benito Beghelli, Terni, and Pierpaolo Camprincoli, Florence, Italy, assignors to Montecatini Edison S.p.A., Milan, Italy
No Drawing. Filed Aug. 10, 1970, Ser. No. 62,602
Claims priority, application Italy, Aug. 11, 1969, 20,795A/69
Int. Cl. C08g 45/04
U.S. Cl. 260—837 R                9 Claims

ABSTRACT OF THE DISCLOSURE

There is disclosed a process for preparing fibers based on olefin polymers consisting essentially of isotactic macromolecules, which fibers have improved receptivity for dyestuffs of the acid, metallized, and plastosoluble classes. The dyeing properties of the fibers are modified by means of basic nitrogen-containing polymers and copolymers, such as the product obtained by polymerizing epichlorhydrin with aminic compounds, which are treated with an epoxy compound in the course of granulation and/or during spinning operations.

THE PRIOR ART

Earlier patents and applications originating with our group disclosed a process for improving the dyeing properties of fibers based on polyolefins by adding to the polyolefin, prior to spinning it into fibers, basic nitrogen-containing polymers and copolymers, preferably products obtained by polymerizing epichlorhydrin with aminic compounds.

Such polymers or copolymers are generally soluble or swellable by aqueous acid solutions such as, for instance, those used as dyebaths.

For that reason, the fibers containing the basic nitrogen-containing polymers or copolymers as dyeing modifiers are treated with substances capable of rendering the modifying polymer or copolymer insoluble in the dyebaths. Various substances may be used for accomplishing this purpose. Among them, the preferred treating agents are mono- and di-epoxy compounds.

In general, the after-treatment of the fibers for insolubilizing the dyeing modifiers comprising the polymers or copolymers containing basic nitrogen are very costly and, in some cases, may even be dangerous for the operators.

Methods for eliminating the problems and involving treatment of the modifying polymers or copolymers prior to spinning the polyolefin into fibers have been suggested.

According to one of said methods, the modifying polymer or copolymer containing basic nitrogen and the epoxy compound are reacted with each other and the resulting insoluble and unmeltable product is ground and mixed with the polyolefin, e.g., polypropylene consisting essentially of isotactic polypropylene, and the granulated mixture is spun into fibers by the conventional methods.

The method has the drawback that the dyeing properties of the fibers are poor, due to the insufficient fineness of the particles obtained by grinding the reaction product of the modifier and epoxy compound.

In fact, in order to insure that the fibers will have good dyeing properties, the size of the particles of the insoluble reaction product of the modifier and epoxy compound should be below one micron. However, such sizes cannot be achieved even if the grinding is carried out at extremely low temperatures, that is, at temperatures which avoid agglomerating the particles.

Another suggested method involves dissolving the modifier and epoxy compound in suitable solvents, adding the solution to the polyolefin powder, e.g., polypropylene powder, drying the mixture to remove the solvent, granulating the dry mixture, and spinning it into fibers by the known methods.

The last-mentioned method also failed to yield fibers having good dyeability, inasmuch as the modifier treated with the epoxy compound was found to be dispersed in the fibers in a state of coarse macroscopic subdivision.

The use of the treated modifier in the form of coarse particles has the disadvantage of rapidly clogging the filters of the spinnerets. In addition to interfering with a smooth, regular spinning process, the clogging also results in pollution of the molten mass being spun, due to decomposition of the material accumulated in the spinneret filter.

THE PRESENT INVENTION

One object of this invention was to provide a simplified process for preparing fibers of the polyolefins the dyeing properties of which are modified by the insolubilized basic nitrogen-containing polymers or copolymers and which permits of a homogeneous distribution and dispersion of extremely fine particles of the treated modifier throughout the polyolefin mass.

This and other objects are achieved by the invention in accordance with which the modifying basic nitrogen-containing polymers or copolymers are treated with an epoxy compound in the course of the granulation and/or spinning operations.

The treatment with the epoxy compound can be carried out, for instance, by mixing, during the spinning, two granulates, one consisting of a mixture of the crystalline polyolefin consisting essentially of isotactic macromolecules and the dyeing modifier, and the other consisting of the mixtures of the crystalline polyolefin and an epoxy compound.

In accordance with another method, the epoxy compound can be injected into a screw extruder containing a mixture of molten crystalline polyolefin and dyeing modifier. Alternatively, the dyeing modifier may be injected into the screw extruder containing a mixture of the molten crystalline polyolefin and the epoxy compound.

Still another method involves injecting the modifier and epoxy compound into the screw extruder already containing the molten polyolefin.

Particularly suitable modifiers of the dyeing properties of the crystalline polyolefins consisting essentially of isotactic macromolecules are the basic nitrogen-containing condensation polymers and copolymers of epichlorhydrin with amines, more particularly the following copolymers:

epichlorhydrin/piperazine/n-octadecylamine;
epichlorhydrin/piperazine/dicyclohexyl-hexamethylenediamine;
epichlorhydrin/piperazine/dimethylhexamethylenediamine;

and the like.

The dyeing modifier may be added in a quantity comprised between about 2 to 10% by weight in respect to the crystalline polyolefins.

As epoxy compound, the epoxy polymers obtained by polycondensation of bis-phenols with epichlorhydrin are particularly suitable and are characterized by the presence of oxyranic end groups.

The polyolefins used in practicing the invention are normally crystalline and made up essentially of isotactic macromolecules, that is of macromolecules having substantially isotactic structure.

Preferably, the polyolefin is polypropylene consisting essentially of isotactic polypropylene, as disclosed and claimed in Natta et al. U.S. Pat. 3,112,300, or a crystalline ethylene/propylene copolymer in which the propylene predominates (over 50%).

In general the invention has utility in enhancing the dye receptivity of crystalline polymers obtained from monomers of the general formula $CH_2=CH-R$ in which R is hydrogen or an alkyl or aryl radical. Included are polyethylene, polypropylene, polybutene-1, polypentene-1, polyhexene-1, poly-4-methylpentene-1, polyoctene-1, polystyrene, and the like.

The granulating and spinning operations are carried out in apparatuses in which one operates in the absence of oxygen, but preferably in an atmosphere of inert gas, such as, for instance, nitrogen.

Various adjuvants may be incorporated during the mixing, such as delustering agents, stabilizers, dispersants, and the like.

After spinning, the filaments or threads may be stretched, for example at a stretch ratio comprised between 1.5:1 and 10:1, and at a temperature comprised, generally, between 80° C. and 150° C. The stretching devices may be heated by means of hot air, vapor, or any other suitable fluid, or may be provided with a heating plate. Or, after extrusion, the filaments may be strongly oriented by known methods.

The filaments can be dimensionally stabilized by heating them, in a free-to-shrink condition or under conditions of controlled shrinkage, at a temperature of 80° C. to 160° C.

Conventional spinnerets may be used in the spinning operation. Preferably, the orifices of the spinnerets used have diameters greater than 0.5 mm. and a length/diameter ratio greater than 1.1, preferably between 10 and 30.

The orifices may be circular or non-circular in cross-section.

The filaments may be mono- or multi-filaments and used in the preparation of continuous threads or staple, of bulk yarns or bulk staple, and of fibrous structures of the non-woven or spun-bonded types.

The fibers (or other manufactured shaped articles) obtained according to this invention, contain the insolubilized basic nitrogen-containing modifier of the dye receptivity in finely divided form and are readly dyeable with dyestuffs of the direct, acid, chrome, metalized, vat and plastosoluble classes.

The following examples are given to illustrate the invention and are not intended to be limiting.

EXAMPLE 1

In a Henschell type mixer there was prepared a mixture consisting of:

18.76 kg. of polypropylene (melt index=20.9; ashes= 0.095% and a residue of extraction with n-heptane of about 97.1%);
40 g. of calcium stearate;
1.2 kg. of n-octadecylamine/epichlorohydrin/piperazine polycondensate (0.3:1.3:1 in moles).

The polycondensate showed a specific viscosity of 0.31, measured in a 1% solution of isopropanol at 25° C.

Thereupon, 0.26 kg. of a resin obtained by polycondensation of epichlorohydrin with bisphenol A (molecular weight 900, oxyranic groups=9.05%), was mixed separately with 19.7 kg. of polypropylene and 40 g. of calcium stearate.

The two mixtures were granulated separately in an extruder, in a nitrogen atmosphere, at 200° C. The granulates were then mixed together and spun under the following spinning conditions:

worm-screw temperature: 220° C.
temperature of extruding head: 200° C.
temperature of spinneret: 200° C.
spinneret having 40 holes with a diameter of 0.8 mm. and with a length of 16 mm.:
maximum pressure: 80 kg./cm.$^2$
winding up speed: 465 mt./min.

The fibers obtained were then stretched in vapor at 130° C. with a stretch ratio of 2.9. The fibers thus obtained showed a good receptivity to the following dyestuffs and the dyed fibers showed excellent fastness:

benzyle red sol. 2BL: (C.I. acid red 127)
alizarin sky blue R: (C.I. acid blue 62)
acid black JVS: (C.I. acid black 1)
lanasyn red 2GL: (C.I. acid red 216)
lanasyn brown GRL: (C.I. acid brown 28)
stenamine bordeau R: (C.I. acid red 179)

By treating the fibers for 60 minutes at 90° C., with a solution of 1 cc./lt. of aionic SCL and 3 cc./lt. of HCOOH at 85%, there occurred a slight variation in the percent nitrogen present in the fibers, that is, from 0.53% to 0.41%.

Moreover, with the fibers obtained according to this process, the "optical yield" is about double that obtainable with the same dyestuffs on fibers modified by the addition of the ground product of reaction between the tintorial modifier and the cross-linking agent.

The "optical yield" was determined by measuring the quantity of dyes necessary for obtaining under the same dyeing conditions a certain shade.

EXAMPLE 2

In a Henschell type mixer there was prepared a mixture consisting of:

18.76 kg. of polypropylene (melt index of 16.7, ashes =0.01% and a residue of extraction with n-heptone =97.1)
40 g. of calcium stearate
1.2 kg. of NN'dicyclohexylhexamethylenediamine/epichlorhydrin/piperazine polycondensate (0.2:1.2:1, in moles), having a specific viscosity of 0.41, measured in a 1% chloroformic solution at 25° C.
0.4 kg. of resin, obtained by polycondensation of epichlorhydrin with bisphenol A (molecular weight 900; oxyranic groups=0.05%), was mixed separately with 19.56 kg. of polypropylene and 40 gr. of calcium stearate.

The two mixtures were then granulated separately in an extruder, in a nitrogen atmosphere, at 200° C. The granulates were mixed together and transformed into fibers by spinning under the following conditions:

worm-screw temperature: 220° C.
extrusion head temperature: 200° C.
spinneret temperature: 200° C.
spinneret: 40 holes with a diameter of 0.8 mm. and a length of 16 mm.:
maximum pressure: 80 kg./cm.$^2$
winding up speed: 315 mt./min.

The fibers thus obtained were stretched in vapor at 130° C. with a stretch ratio of 2.9. These fibers showed a good receptivity to the following dyes, and the dyed fibers showed excellent fastness:

benzyle red sol. 2BL: (C.I' acid red 127)
alizarin sky blue R: (C.I. acid blue 62)
acid black JVS: (C.I. acid black 1)
lanasyn red 2GL: (C.I. acid red 216)
lanasyn brown GRL: (C.I. acid brown 28)
stenamine bordeau R: (C.I. acid red 179)

The fibers extracted in a Kumagawa extractor for 24 hours with an ethanol/toluene mixture (70/30 by volume) gave just a small variation in the percent nitrogen, that is from 0.52% to 0.36%.

When the fibers were treated for 60 minutes at 90° C. with a solution of 1 cc./lt. of aionic SCL and 3 cc./lt. of HCOOH at 85%, the variation in the percent nitrogen was from 0.52% to 0.43%.

EXAMPLE 3

In a Henschell type mixer there was prepared a mixture consisting of:

polypropylene (melt index=16.7, ashes=0.01% and a residue of extraction with n-heptane=97.1%): 18.76 kg.
calcium stearate: 40 g.
NN'dimethylhexamethylenediamine/epichlorhydrin/piperazine polycondensate (0.25:1.25:1, in moles), with a specific viscosity of 0.41, measured in 1% chloroformic solution at 25° C.: 1.2 kg.

About 0.6 kg. of resin obtained by the polycondensation of epichlorhydrin with bisphenol A (molecular weight 900; oxyranic groups=9.05%), was mixed separately with 19.36 kg. of polypropylene and 40 g. of calcium stearate.

The two mixtures were granulated separately in an extruder, in a nitrogen atmosphere, at 200° C., and then mixed together and transformed into fibers under the following spinning conditions:

wormscrew temperature: 220° C.
extrusion head temperature: 200° C.
spinneret temperature: 200° C.
spinneret: 40 holes with a diameter of 0.8 mm. and a length of 16 mm.:
 maximum pressure: 100 kg./sq. cm.
 winding up speed: 300 mt./min.

The fibers thus obtained were then stretched in vapor at 130° C. with a stretch ratio of 2.9. The fibers thus obtained showed a good receptivity to the following dyes and the dyed fibers showed excellent fastness:

benzyle red sol. 2BL: (C.I. acid red 127)
alizarin sky blue R: (C.I. acid blue 62)
acid black JVS: (C.I. acid black 1)
lanasyn red 2GL: (C.I. acid red 216)
lanasyn brown GRL: (C.I. acid brown 28)
stenamine bordeau R: (C.I. acid red 179)

The fibers, extracted in Kumagawa for 24 hours with a mixture of ethanol/toluene (70/30 by volume), gave only a small variation in the percentage of nitrogen, that is: from 0.51% to 0.39%.

On subjecting the fibers to a 60 minute treatment at 90° C. with a solution of 1 cc./lt. of aionic SCL and 3 cc./lt. of HCOOH at 85%, there occurred a variation in the nitrogen percentage from 0.51% to 0.45%.

EXAMPLE 4

In a Henschell type mixer there was prepared a mixture consisting of:

polypropylene, (melt index=18.6, ashes=0.015% and a residue at heptanic extraction=97.1%): 48 kg.
resin obtained by polycondensation of epichlorhydrin with bisphenol A (molecular weight 900, oxyranic groups =9.05%): 0.325 kg.
calcium stearate: 100 g.

This mixture was granulated in an extruder, in a nitrogen atmosphere, at 200° C. During granulation, when in the molten mass the epoxy resin was in a state of fine dispersion, there was injected into the extruder 1.5 kg. of the nitrogen-containing condensation copolymer described in Example 1.

The spinning occurred under the following conditions:

wormscrew temperature: 230° C.
extrusion head temperature: 230° C.
spinneret temperature: 230° C.
spinneret: 40 moles with a diameter of 0.8 mm. and a length of 16 mm.:
 maximum pressure: 100 kg./cm.²
 winding up speed: 500 mt./min.

The fibers thus obtained were stretched in vapor at 130° C., with a stretch ratio equal to 2.9. The stretched fibers showed a good receptivity for the following dyes and the dyed fibers showed excellent fastness:

benzyle red sol. 2BL: (C.I. acid red 127)
alizarin sky blue R: (C.I. acid blue 62)
acid black JVS: (C.I. acid black 1)
lanasyn red 2GL: (C.I. acid red 216)
lanasyn brown GRL: (C.I. acid brown 28)
stenamine bordeau R: (C.I. acid red 179)

EXAMPLE 5

In a Henschell type mixer there was prepared a mixture consisting of:

polypropylene (melt index=18.6, ashes=0.015% and a residue of extraction with heptane=97.1%): 48 g.
calcium stearate: 0.1 kg.
N,N'-dicyclohexylhexamethylenediamine/epichlorhydrin/piperazine polycondensate (0.2:1.2:1 in moles), with a specific viscosity of 0.36, measured in chloroformic solution at 1%, at 25° C.: 1.5 kg.

This mixture was granulated in an extruder, in a nitrogen atmosphere, at 200° C. During granulation, with the tintorial modifier in the molten mass in a finely dispersed state, there was injected into the screw-chamber the epoxy resin described in Example 1, in a quantity of 0.325 kg.

The mixture was spun under the following conditions:

wormscrew temperature: 230° C.
extruding head temperature: 230° C.
spinneret temperature: 230° C.
spinneret with 40 holes of 0.8 mm. diameter and 16 mm. length:
 maximum pressure: 100 kg./cm.²
 winding up speed: 500 mt./min.

The fibers thus obtained were stretched in vapor at 130° C. with a stretch ratio of 2.9. The stretched fibers showed a good receptivity for the following dyes and the dyed fibers showed excellent fastness:

benzyl red sol. 2BL: (C.I. acid red 127)
alizarin sky blue R: (C.I. acid blue 62)
acid black JVS: (C.I. acid black 1)
lanasyn red 2GL: (C.I. acid red 216)
lanasyn brown GRL: (C.I. acid brown 28)
stenamine bordeau R: (C.I. acid red 179)

While the invention has been described and exemplified in connection with modifying the dye receptivity of fibers comprising crystalline polyolefins, it can be used, also, for improving the dye receptivity of other manufactured shaped articles formed of or comprising the crystalline polyolefins consisting prevailingly (over 50%) of isotatic macromolecules.

Various changes may be made in practicing the invention without departing from its spirit. Therefore, we intend to include in the scope of the appended claims all modifications which will be obvious to those skilled in the art from the description and working examples given herein.

What is claimed is:

1. In a process for preparing dyeable fibers of polymers of olefins having the formula $CH_2=CH-R$, in which R is selected from the group consisting of hydrogen, and alkyl radicals, in which a mixture of the olefin polymer and 2–10% by weight of a dyeing modifier which is selected from the group consisting of condensation homopolymers and copolymers of epichlorhydrin and amines, is granulated and spun into fibers, and the dyeing modifier is insolubilized by treatment with an epoxy compound, the improvement which consists in homogeneously distributing the insolubilized dyeing modifier, in the form of particles having a size below one micron, in the olefin polymer, by mixing the modifier with an epoxy compound containing at least two oxyranic end groups in the course of the granulating and/or spinning operations.

2. The improvement according to claim 1, in which the olefin polymer is normally crystalline and consists prevailingly of isotactic macromolecules.

3. The improvement according to claim 1, further characterized in that, during the spinning operation, a granulate consisting of the olefin polymer and the dyeing modifier is mixed with a granulate consisting of the olefin polymer and the epoxy compound.

4. The improvement according to claim 1, further characterized in that the epoxy compound is injected into a screw-extruder containing a molten mixture of the olefin polymer and the dyeing modifier.

5. The improvement according to claim 1, further characterized in that the dyeing modifier is injected into a screw-extruder containing a molten mixture of the olefin polymer and the epoxy compound.

6. The improvement according to claim 1, further characterized in that the dyeing modifier and the epoxy compound are injected into a screw-extruder containing the olefin polymer in molten condition.

7. The improvement according to claim 1, characterized in that the olefin polymer is polypropylene consisting essentially of isotatic polypropylene.

8. The improvement according to claim 1, characterized in that the olefin polymer is a crystalline copolymer of ethylene and propylene in which units of polymerized propylene predominate.

9. The improvement according to claim 1, characterized in that the epoxy compound is a polymer obtained by the polycondensation of bisphenols with epichlorhydrin, and contains oxyranic end groups.

References Cited
UNITED STATES PATENTS

| | | | |
|---|---|---|---|
| 3,107,228 | 10/1963 | Cappuccio | 260—837 |
| 3,137,989 | 6/1964 | Fior | 260—837 |
| 3,454,670 | 7/1969 | Cantatore | 260—836 |
| 3,098,697 | 7/1963 | Cappuccio | 260—836 |
| 3,182,105 | 5/1965 | Bonvicini | 260—836 |
| 3,294,864 | 12/1966 | Karoly | 260—837 |
| 3,515,698 | 6/1970 | Mauz | 260—837 |

PAUL LIEBERMAN, Primary Examiner

U.S. Cl. X.R.

260—836, 897 R; 264—211